United States Patent Office 3,509,064
Patented Apr. 28, 1970

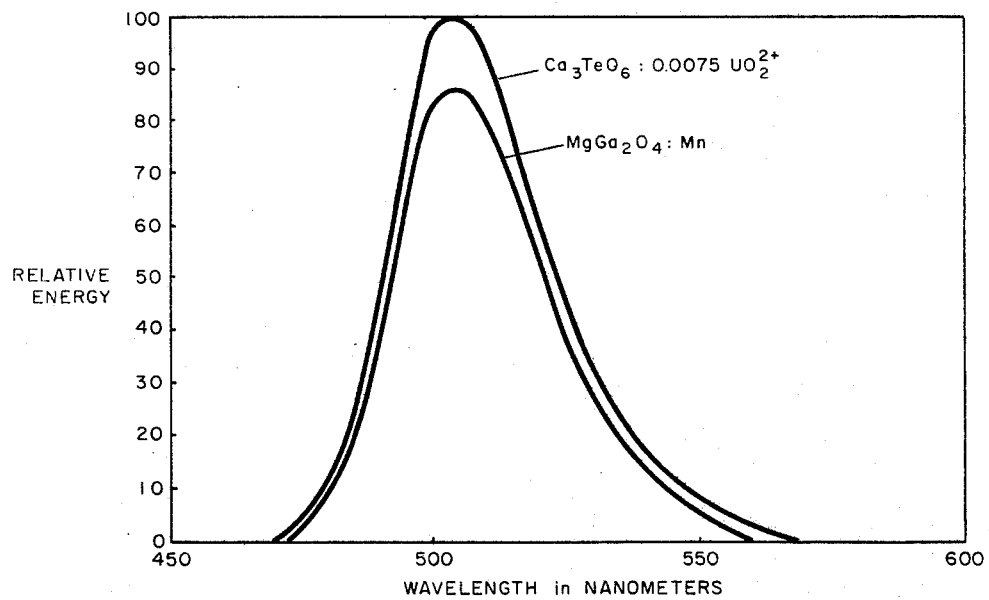

3,509,064
ALKALINE EARTH TELLURATE PHOSPHORS
Samuel Natansohn, Massapequa Park, N.Y., assignor to General Telephone & Electronics Laboratories, Incorporated, a corporation of Delaware
Filed Dec. 1, 1966, Ser. No. 598,384
Int. Cl. C09k 1/04
U.S. Cl. 252—301.1                14 Claims

ABSTRACT OF THE DISCLOSURE

A fluorescent material, uranyl activated calcium tellurate, having an emission spectrum suitable for use in xerographic reproduction equipment. In addition, other alkaline earth tellurate phosphors activated by uranyl and europium ions are disclosed.

BACKGROUND OF THE INVENTION

This invention relates to fluorescent materials which emit light when exposed to ultraviolet and cathode ray radiation and, in particular to alkaline earth tellurate phosphors activated by uranyl and europium ions.

A light source for use with a xerographic photoreceptor should have an emission spectrum corresponding to the region in which the photoreceptor is most sensitive. For certain xerographic equipment in use today, a narrow peak emission in the region 500 to 530 nanometer has been found highly effective and therefore fluorescent lamps have been developed which emit light in this region. One of the most widely used lamps employs a phosphor consisting of zinc orthosilicate. More recently, a phosphor, magnesium gallate activated with manganese, which has a more desirable spectral response than zinc orthosilicate and maintains its light output over a long period of use has been developed.

While manganese activated magnesium gallate has excellent brightness and long life characteristics, the material is relatively expensive as compared to zinc orthosilicate. Accordingly, I have invented a new phosphor which is considerably less expensive than manganese activated magnesium gallate and is also brighter over substantially the same range of wavelengths.

SUMMARY OF THE INVENTION

The present invention comprises generally a phosphor system consisting essentially of compositions defined by the formula $A_nTeO_m:xB$, where A is an alkaline-earth element selected from the group consisting of magnesium, calcium, strontium and barium, B is an activator selected from the group consisting of uranyl ion and europium, $n$ equals 1, 2 or 3, $m$ equals 4, 5 or 6, $m$ minus $n$ equals 3, and $x$ has a value selected to produce fluorescence when the composition is excited by ultraviolet or cathode ray radiation. The concentration, $x$, of uranyl ion required to produce fluorescence under ultraviolet or cathode ray excitation is between 0.005 and 0.1 mole per mole of the host material $A_nTeO_m$, except for uranyl activated calcium orthotellurate, $Ca_3TeO_6:xUO_2^{2+}$, which emits light with values of $x$ as low as 0.005 mole per mole of $Ca_3TeO_6$ and uranyl activated barium pentaoxotellurate which radiates for values of $x$ between 0.001 and 0.5. For the group of phosphors in which B is europium, useful emission is obtained for values of $x$ between 0.05 and 0.5 mole per mole of host material.

In particular, I have found that uranyl activated calcium orthotellurate, $Ca_3TeO_6:UO_2^{2+}$ is well suited for use with the aforementioned commercial xerographic photoreceptors since its peak wavelength is at approximately 500 nanometers. Further, although this material is not at present capable of maintaining its brightness for as long a period use as manganese activated magnesium gallate, its initial brightness and brightness after 100 hours is greater. In addition, uranyl activated calcium orthotellurate is less expensive to manufacture than the gallate phosphor.

While $Ca_3TeO_6:UO_2^{2+}$ is the brightest of the phosphors in the group, useful emission is also obtained when magnesium, strontium or barium are substituted for calcium and the values of $n$ and $m$ are varied as indicated above. In addition, red emission is obtained under ultraviolet and cathode-ray excitation when europium is substituted for uranyl ion as the activator indicating that these materials have application in fluorescent lamps and color tubes. However, phosphor compositions prepared with other rare earths, such as samarium, dysprosium and terbium, as activators exhibit very faint or no visible luminescence.

BRIEF DESCRIPTION OF THE DRAWING

The figure is a plot of the relative energy outputs of uranyl activated calcium orthotellurate and manganese activated magnesum gallate as a function of emission wavelength.

DESCRIPTION OF THE PREFERRED EMBODIMENTS

The alakaline-earth tellurate phosphors may be prepared by mixing thoroughly the appropriate alkaline earth oxide (or any alkaline earth compound which yields the alkaline earth oxide upon thermal decomposition), orthotelluric acid, $Te(OH)_6$, (or any tellurium compound which yields telluric oxide upon thermal decomposition), and the activator. For the uranyl-activated phosphor, the activator is in the form of a uranyl salt. For other luminogens, such as europium, the activator may be in the form of the oxide of the element or a salt decomposable to the oxide.

The mixture is then heated in a series of steps at elevated temperature, the sample being mortared between heating steps. The maximum temperature of the heat treatment depends upon the composition since the thermal stability of the various materials varies considerably within the host material $A_nTeO_m$. The firing is preferably carried out in an atmosphere of oxygen to assure that the tellurium remains in the hexavalent state. However, firing in air has also produced satisfactory phosphors.

In general, it has been found that the most intense fluorescence is obtained in compounds in which the molar ratio of alkali earth oxide to telluric oxide is greater than unity, i.e. 2 or 3. All of the compounds prepared have characteristic X-ray diffraction patterns which do not contain any of the lines of the constituent materials.

The following specific examples are illustrative of the new phosphor system:

EXAMPLE I 7.51 grams of calcium carbonate, $CaCO_3$, 5.74 grams of orthotelluric acid, $Te(OH)_6$ and 0.106 gram of uranyl acetate, $UO_2(C_2H_3O_2)_2 \cdot 2H_2O$ were mixed and then fired successively in an oxygen atmosphere at the following temperatures: 800° C., 900° C., 1000° C., 1100° C., 1200° C., 1250° C., and 1300° C. Each heat treatment, except the last two, was for a duration of approximately four hours, the phosphor being cooled and homogenized by grinding between each firing. The firings at 1250° C. and 1300° C. were for two hours each, instead of four as at the lower temperatures.

The resulting phosphor, $Ca_3TeO_6:0.01\ UO_2^{2+}$, is a white powder which emits green light under ultraviolet excitation with an emission peak at about 505 nanometers and a half-line width of approximately 30 nanometers.

Under cathode-ray excitation, bright green emission is also obtained.

EXAMPLE II

The procedure of Example I was repeated except that the amount of uranyl acetate was varied to produce a group of phosphors, $Ca_3TeO_6:xUO_2$ having activators in the range $x=0.0005$ to 0.1 mole per mole of $Ca_3TeO_6$. Each of these phosphors was excited by four radiation sources: the peak excitation wavelength (about 325 nanometers) selected monochromatically from the emission of a xenon lamp, a General Electric type G4T4 low pressure mercury lamp, a General Electric 100 watt type S-4 medium pressure mercury vapor lamp and an electron beam. The luminescent intensity of the phosphors under each type of illumination was measured in terms of relative photomultiplier response, as shown in Table I, the value 100 being assigned to the composition $$Ca_3TeO_6:0.01\ UO_2^{2+}$$

TABLE I

[Relative luminescent intensity of $Ca_3TeO_6:0.01\ UO_2^{2+}$ as a function of activator concentration]

| | Excitation source | | | |
|---|---|---|---|---|
| $Ca_3TeO_6:xUO_2^{2+}x$ | 325 nm. peak | Low pressure Hg lamp | Medium pressure Hg lamp | Cathode ray |
| 0.0005 | 37 | 53 | 26 | |
| 0.001 | 43 | 69 | 37 | |
| 0.0025 | 75 | 94 | 82 | |
| 0.0050 | 102 | 106 | 105 | 83 |
| 0.0075 | 115 | 109 | 109 | 92 |
| 0.01 | 100 | 100 | 100 | 103 |
| 0.02 | 75 | 87 | 85 | 100 |
| 0.04 | 54 | | | 96 |
| 0.07 | 32 | | | |
| 0.1 | 13 | | | |

A plot of the relative energy output of the brightest of these phosphors, $Ca_3TeO_6:0.0075\ UO_2^{2+}$ under 253.7 nanometer excitation is given as a function of emission wavelength in the figure. For comparison, the spectrum of manganese activated magnesium gallate ($MgCa_2O_4:Mn$) under the same excitation conditions is also given. As shown, the peak energy $MgGa_2O_4:Mn$ is at about 504 nonometers and is approximately 86% that of $$Ca_3TeO_6:0.0075\ UO_2^{2+}$$

which has its peak at about 503 nanometers.

In addition, 40 watt fluoroescent lamps were made having coatings of $Ca_3TeO_6:0.0075\ UO_2^{2+}$ and $MgGa_2O_4:Mn$ of the same density. The initial brightness of the uranyl acvtivated calcium orthotellurate averaged 2360 lumens while that for the manganese activated magnesium tellurate averaged 1890 lumens. With aging, the tellurate coated lamp fell off in brightness more rapidly then the gellate coated lamp but, after 100 hours, still exhibited a greated luminescent intensity.

EXAMPLE III 9.87 grams of barium carbonate, $BaCO_3$, 5.74 grams of orthotelluric acid and 0.1060 gram of uranyl acetate were mixed and subsequently fired at 800° C. and 900° C. in an oxygen atmosphere. Each firing was for a duration of four hours, the material being cooled and ground after each firing.

The resulting phosphor, uranyl activated barium pentaoxotellurate, $Ba_2TeO_5:0.01\ UO_2^{2+}$, is found to emit bright orange light under ultraviolet excitation. The emission spectrum is broad, exhibiting two distinct peaks at 590 and 604 nanometers, and extends far into the red. The half-line width is about 55 nanometers. The response under cathode ray excitation is similar to that under ultraviolet light.

A group of phosphors having the formula $$Ba_2TeO_5:xUO_2^{2+}$$

was prepared by the same method except that $x$ was varied between 0.001 and 0.5 mole per mole of $Ba_2TeO_5$. Over this range, the maximum luminescence was obtained for $x$ equal to 0.02 and 0.05 as indicated in Table II.

TABLE II

[Relative luminescent intensity of $Ba_2T_6O_5:x\ UO_2^{2+}$ as a function of activator concentration]

| $Ba_2TeO_5:x\ UO_2^{2+}x$ | Medium pressure Hg vapor lamp excitation | Excitation peak at 360 nanometers |
|---|---|---|
| 0.001 | 23 | 35 |
| 0.005 | 63 | 71 |
| 0.01 | 76 | 83 |
| 0.02 | 100 | 100 |
| 0.05 | 99 | 94 |
| 0.1 | 68 | 54 |
| 0.2 | 67 | 52 |
| 0.5 | <10 | 16 |

EXAMPLE IV

The phosphors shown in Table III were prepared having the general formulation $A_nTeO_m:0.01\ UO_2^{2+}$. The method of preparing these phosphors was generally the same as described in Example I except for the amount of alkaline earth and the number of firing steps and temperatures. In preparing each phosphor, 5.74 grams of $Te(OH)_6$ and 0.1060 gram $UO_2(C_2H_3O_2)_2 \cdot 2H_2O$ were mixed with the listed amount of alkaline earth compound.

TABLE III

| Composition | Type and amount of alkaline earth comp. (grams) Basic mg. carbonate | 1st °C. | hrs. | 2nd °C. | hrs. | 3rd °C. | hrs. | 4th °C. | hrs. | Emission color |
|---|---|---|---|---|---|---|---|---|---|---|
| $Mg_1TeO_4:0.01\ UO_2^{2+}$ | 2.29 | 600 | 4 | 750 | 4 | 900 | 4 | 1,000 | 4 | Green. |
| $Mg_2TeO_5:0.01\ UO_2^{2+}$ | 4.59 | 600 | 4 | 750 | 4 | 900 | 4 | 1,000 | 4 | Do. |
| $Mg_3TeO_6:0.01\ UO_2^{2+}$ | 6.88 | 800 | 4 | 900 | 4 | 1,000 | 4 | 1,200 | 4 | Do. |
| $Ca_1TeO_4:0.01\ UO_2^{2+}$ | $CaCO_3$ 2.50 | 800 | 4 | 900 | 4 | | | | | Yellow. |
| $Ca_2TeO_5:0.01\ UO_2^{2+}$ | 5.00 | 800 | 4 | 900 | 4 | 1,000 | 4 | | | Green. |
| $Sr_1TeO_4:0.01\ UO_2^{2+}$ | $SrCO_3$ 3.69 | 800 | 4 | 900 | 4 | | | | | Yellow. |
| $Sr_2TeO_5:0.01\ UO_2^{2+}$ | 7.38 | 800 | 4 | 900 | 4 | 1,000 | 4 | | | White. |
| $Sr_3TeO_6:0.01\ UO_2^{2+}$ | 11.07 | 800 | 4 | 900 | 4 | 1,000 | 4 | 1,200 | 4 | Green. |
| $Ba_1TeO_4:0.01\ UO_2^{2+}$ | $BaCO_3$ 4.93 | 800 | 4 | 900 | 4 | | | | | Red. |
| $Ba_3TeO_6:0.01\ UO_2^{2+}$ | 14.80 | 800 | 4 | 900 | 4 | 1,000 | 4 | | | Red. |

The light emitted by the phosphors listed in Table II when excited by ultraviolet radiation was of lower brightness than either uranyl activated calcium orthotellurate (Example I) or uranyl activated barium pentaoxotellurate (Example III). The colors of the emission as observed by the eye are shown in the table.

EXAMPLE V 7.51 grams of calcium carbonate, 5.74 grams of orthotelluric acid and 0.440 gram of europium oxide $Eu_2O_3$ were mixed and then heated at 800° C., 900° C., 1000° C. and 1200° C. in an oxygen atmosphere. Each firing was for four hours and the composition was cooled and ground after each firing. The resulting phosphor $CaTeO_6:0.1\ Eu^{3+}$ is a white powder which emits red light under ultraviolet and cathode ray excitation. The principal emission peaks are observed between 610 and 630 nanometers. Europium activated calcium orthotellurate phosphors $Ca_3TeO_6:x\ Eu^3$ were also prepared wherein $x$ was varied between 0.05 and 0.2 mole per mole of $Ca_3TeO_6$. Red luminescence was obtained over this entire range.

The phosphors of Table III were also prepared using 0.1 $Eu^{3+}$ in place of 0.01 $UO_2^{2+}$ in the various compositions. Red luminescence was obtained in each case but it was not as strong as that exhibited by $Ca_3TeO_6:Eu^{3+}$ $Ba_2TeO_5:Eu^{3+}$ was prepared but only a very faint red response was noted. This is in contrast to $Ba_2TeO_5:UO_2^{2+}$ which exhibited excellent luminescent properties.

As many changes could be made in the above described processes and many different compositions could be made without departing from the scope thereof, it is intended that all matter contained therein shall be interpreted as illustrative and not in a limiting sense.

What is claimed is:

1. A phosphor system consisting essentially of compositions defined by the formula $A_nTeO_m:xB$, where A is an alkaline-earth element selected from the group consisting of magnesium, calcium, strontium and barium, B is an activator selected from the group consisting of uranyl ion and europium, $n$ equals 1, 2 or 3, $m$ equals 4, 5 or 6, $m$ minus $n$ equals 3 and $x$ has a value selected to produce fluorescence when the composition is excited by ultraviolet or cathode ray radiation.

2. The phosphor system defined by claim 1 wherein B is the uranyl ion and $x$ is in the range 0.005 to 0.1 mole per mole of $A_nTe_eO_m$.

3. The phosphor system defined by claim 2 wherein $x$ is approximately 0.01 mole per mole of $A_nTeO_m$.

4. The phosphor system defined by claim 1 wherein B is europium and $x$ is in the range 0.05 to 0.5 mole per mole of $A_nTeO_m$.

5. The phosphor system defined by claim 4 wherein $x$ is approximately 0.1 mole per mole of $A_nTeO_m$.

6. A phosphor composition consisting essentially of uranyl activated calcium orthotellurate.

7. The phosphor composition defined by claim 6 wherein the amount of uranyl activator is between 0.0005 and 0.1 mole per mole of calcium orthotellurate.

8. The phosphor composition defined by claim 6 wherein the amount of uranyl activator is between 0.0025 and 0.02 mole per mole of calcium orthotellurate.

9. A phosphor composition consisting essentially of uranyl activated barium pentaoxotellurate.

10. The phosphor composition defined by claim 9 wherein the amount of uranyl activator is between 0.001 and 0.5 mole per mole of barium pentaoxotellurate.

11. The phosphor composition defined by claim 9 wherein the amount of uranyl activator is between 0.005 and 0.1 mole per mole of barium pentaoxotellurate.

12. A phosphor composition consisting essentially of europium activated calcium orthotellurate.

13. The phosphor composition defined by claim 12 wherein the amount of europium activator is between 0.05 and 0.2 mole per mole of calcium orthotellurate.

14. The phosphor composition defined by claim 12 wherein the amount of europium activator is approximately 0.1 mole per mole of calcium orthotellurate.

References Cited

UNITED STATES PATENTS 3,250,722   5/1966   Borchardt   252—301.4

TOBIAS E. LEVOW, Primary Examiner

R. D. EDMONDS, Assistant Examiner

U.S. Cl. X.R.

252—301.4

PO-1050
(5/69)

UNITED STATES PATENT OFFICE
CERTIFICATE OF CORRECTION

Patent No. 3,509,064          Dated April 28, 1970

Inventor(s) Samuel Natansohn

It is certified that error appears in the above-identified patent and that said Letters Patent are hereby corrected as shown below:

Column 1, line 61, "0.005" should read --0.0005--

Column 3, line 63, delete "tellurate" and insert --gallate--

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents